(12) United States Patent
Beckmann

(10) Patent No.: US 6,509,078 B1
(45) Date of Patent: Jan. 21, 2003

(54) COMPOSITE MATERIAL

(75) Inventor: Friedhelm Beckmann, Hiddenhausen (DE)

(73) Assignee: Moeller Plast GmbH, Bielefeld (DE)

( * ) Notice: Subject to any disclaimer, the term of this patent is extended or adjusted under 35 U.S.C. 154(b) by 148 days.

(21) Appl. No.: 09/641,870

(22) Filed: Aug. 18, 2000

(30) Foreign Application Priority Data

Aug. 18, 1999 (DE) .......................................... 199 39 227

(51) Int. Cl.7 ................................................ B32B 3/00
(52) U.S. Cl. .............................. 428/71; 428/74; 428/76
(58) Field of Search .............................. 428/74, 76, 71, 428/212, 304.4, 402, 172, 318.8, 542.2

(56) References Cited

U.S. PATENT DOCUMENTS 4,672,701 A * 6/1987 Kucsis ........................ 428/74
5,624,726 A * 4/1997 Sanocki et al. ............... 428/74

* cited by examiner

*Primary Examiner*—Donald J. Loney
(74) *Attorney, Agent, or Firm*—Laurence A. Greenberg; Werner H. Stemer; Gregory L. Mayback

(57) ABSTRACT

The composite material can be produced without complicated measures to fix the distance between the covering layers and it can be brought into a desired three-dimensional contour. The composite material has a first outer covering layer and, at a distance from it, a second outer covering layer, in particular of metal, plastic or wood veneer. An intermediate layer is arranged between the covering layers. The intermediate layer is formed by at least one natural fiber mat of renewable raw materials which is interspersed with fusible and/or foamable particles and/or curable substances.

24 Claims, 1 Drawing Sheet

COMPOSITE MATERIAL

BACKGROUND OF THE INVENTION

Field of the Invention

The invention relates to a composite material with a first outer covering layer and a second outer covering layer spaced from the first outer covering layer at a spacing distance, and an intermediate layer between the covering layers.

In the production of composite materials, covering layers, which may consist of metal, plastic, wood veneers, or other laminates, are generally used and any desired intermediate space is produced between them by introducing an intermediate layer of plastic or foamed plastic. The covering layers in sheet form must thereby be fixed at a desired distance from each other and an escape of the plastic, tacky polymer composition must be avoided by a lateral limitation. When using a foamable composition for the intermediate layer, pressure relief must take place in order that the foam can expand freely and is not compressed under the load of a weight. The properties of such composite materials are determined both by the covering layers and by the intermediate layer introduced. Depending on the material structure, the composite effect must be enhanced by additional adhesion promoters or a physically or chemically setting adhesive. A disadvantage here is that solvents or the like are released during these operations and lead to environmental pollution. In the case of relatively small sheet segments or three-dimensionally shaped sandwich components, they must be produced in complex molds which retain the desired contour and close off with a sealing effect the space between the covering layers or sheet elements, in order that the composition forming the intermediate layer, possibly a foamable composition, does not escape from the intermediate space. The material of the intermediate layer located between the covering layers usually has a uniform consistency, so that harder or more compliant regions within a component cannot be produced, or can only be produced in a multi-stage process.

SUMMARY OF THE INVENTION

The object of the invention is to provide a composite material which overcomes the above-noted deficiencies and disadvantages of the prior art devices and methods of this kind, and which can be produced without complicated fixing of the distance between the covering layers and which can be brought into a desired three-dimensional contour in a relatively uncomplicated way.

With the above and other objects in view there is provided, in accordance with the invention, a composite material, comprising:

a first outer covering layer;

a second outer covering layer disposed at a spacing distance from the first outer covering layer; and an intermediate layer arranged between the first and second outer covering layers and formed by at least one natural fiber mat of renewable raw materials and interspersed with material components selected from the group consisting of fusible particles, foamable particles, and curable substances.

In other words, the objects are satisfied with a composite material with a first and a second outer covering layer, in particular of metal, plastics or wood veneer, arranged a distance apart, and an intermediate layer arranged between the covering layers which is distinguished by the fact that the intermediate layer is formed by a t least one natural fiber mat of renewable raw materials which is interspersed with fusible and/or foam able particles and/or curable substances.

The outer covering layers are preferably formed of metal, plastic, or wood veneer.

In accordance with an added feature of the invention, the at least one natural fiber mat is flax, hemp, jute, kenaf, sisal, or a combination of the materials.

In accordance with an additional feature of the invention, the natural fibers of the natural fiber mat have a defined critical temperature, and the fusible particles have a melting point below the critical temperature. Preferably, the melting point lies below 240° C.

In accordance with another feature of the invention, the fusible particles are selected from polypropylene, LD or HD polyethylene, EVA, nylon 11, and nylon 12.

In accordance with a further feature of the invention, the natural fiber mat has a natural fiber content of between 30% and 95% and a particle content between 5% and 20%.

Preferably, at least some of the fusible particles are fibrous particles.

In accordance with again an added feature of the invention, the at least one natural fiber mat is one of a plurality of natural fiber mats. The plurality of natural fiber mats have a substantially identical material composition and a substantially identical degree of compaction. In the alternative, they have mutually different material compositions and/or the fiber mats have mutually different degrees of compaction.

In accordance with again an additional feature of the invention, the intermediate layer has a predefined degree of compaction. In a preferred embodiment, the intermediate layer is compacted locally to varying degrees.

In accordance with again another feature of the invention, the spacing distance between the first and second covering layers is approximately inversely proportional to a degree of compaction of the intermediate layer.

In accordance with a preferred variation, the intermediate layer comprises one or more relatively highly compacted natural fiber mat and one or more less highly compacted natural fiber mats.

In a further development, the first and second covering layers are formed of metal (e.g., aluminum, copper, and nickel), thermosetting material, thermoplastic material, wood, laminate, compacted natural fiber layers, or combinations thereof.

In an advantageous development, the composite material is produced endlessly. In the alternative, the first and second covering layers and the intermediate layer are cut-to-size pieces.

In a particularly advantageous development of the invention, the intermediate layer and/or the first and/or second covering layers have punched clearances formed therein.

Preferably, the intermediate layer is provided with reinforcing linings, such as linings with or from glass fibers, carbon fibers, aramid fibers, natural fibers, and reinforcing woven fabric.

In an alternative embodiment, at least one of the first and second covering layers is provided with a decorative material. Preferable decorative materials are polymer films, textile materials, and leather.

In accordance with a concomitant feature of the invention, the intermediate layer is formed of foam, rubber, and/or thermoplastic elastomer.

Other features which are considered as characteristic for the invention are set forth in the appended claims.

Although the invention is illustrated and described herein as embodied in a composite material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The advantageous properties of the composite material according to the invention are achieved by using one or more natural fiber mats which comprises or consist of renewable raw materials, such as for example flax, hemp, jute, kenaf, sisal or a combination thereof, and are interspersed with fusible or foamable fibers or particles or substances which can be cured in some other way. These include uncured thermosetting resins and the like. In the case of a fusible material, it consists of a material with a melting temperature below the temperature that is usually critical for natural fibers, namely, of approximately 240° C. Therefore, polypropylene, LD/HD polyethylene or EVA, for example, but preferably nylon 11 or nylon 12, can be used. The natural fiber content is thereby preferably between 30% and 95%, with a corresponding admixture of the component bonding the fibers.

Production takes place by the bonding, for example fusible, component being made to melt by supplying energy and the material of the intermediate layer being continuously or discontinuously introduced at the same time between covering layers (sheet elements) of metal, such as aluminum, copper or nickel, and/or of thermosetting and/or thermoplastic materials or of wood or other laminates, and pressed in the warm state with the covering layers. The molten material between the natural fibers has the effect on the one hand that the fibers are bonded to one another and on the other hand that a film of melt is created at the respective surfaces, leading to adhesive bonding with the materials of the covering layers.

Depending on the desired strength and rigidity of the composite material, the intermediate layer can in this case be precompacted, fully compacted or, with corresponding shaping of the material or component, compacted to greater or lesser degrees in partial regions, by means of varying compaction.

Figure 1:
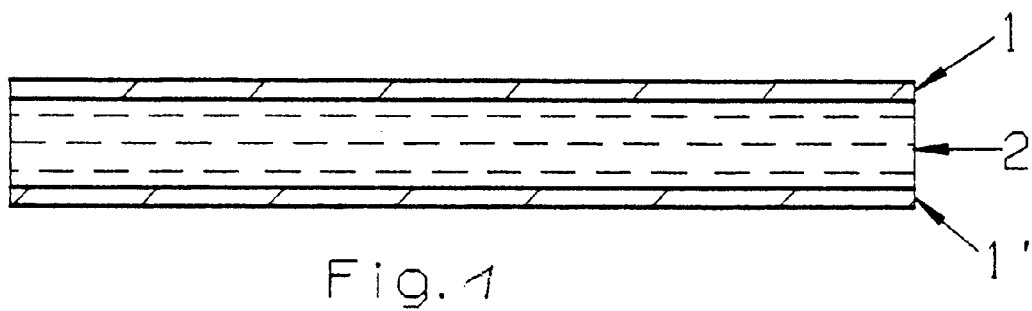
FIG. 1 is a schematic cross-sectional view of a composite material according to the invention, in which the intermediate layer is compacted to a relatively small degree.

Referring now to the figures of the drawing in detail and first, particularly, to FIG. 1 thereof, there is seen a little-compacted natural fiber mat 2 is arranged between an upper covering layer 1 and a lower covering layer 1'.

Figure 2:
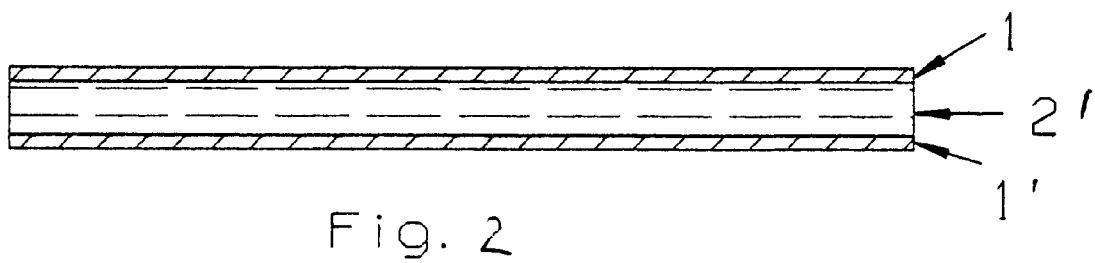
FIG. 2 is a similar view of a composite material in which the intermediate layer is relatively highly compacted.

In FIG. 2, a highly compacted natural fiber mat 2' is provided between the two covering layers 1, 1'.

Figure 3:
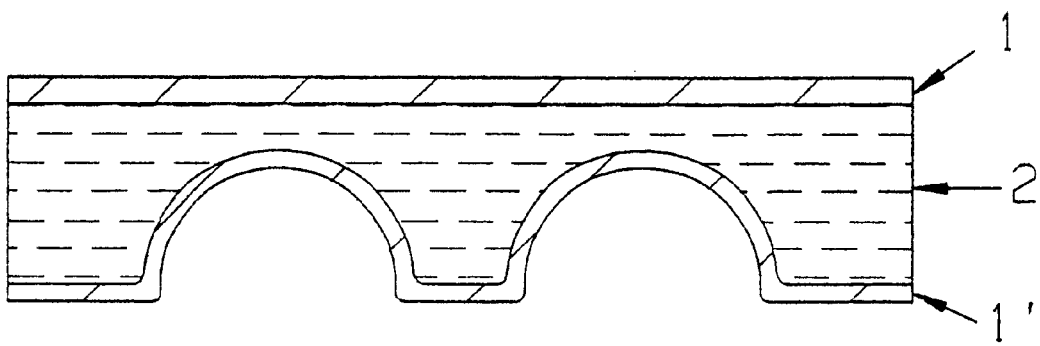
FIG. 3 is a schematic cross-section taken through a composite material according to the invention in which the intermediate layer is compacted locally to varying degrees.

With reference to FIG. 3, a first (upper) covering layer 1 is formed at the top. A second (lower) covering layer 1' is formed in a profiled or corrugated manner. The intermediate layer, arranged between the covering layers 1, 1' and formed by a natural fiber mat 2, is compacted locally to varying degrees. The three-dimensionally shaped covering layer 1' may already have its shape in advance or alternatively be brought into its desired shape only during production of the composite material, while the intermediate layer is correspondingly compacted in the course of the production of the composite material, a smaller distance between the covering layers corresponding to a higher degree of compaction of the intermediate layer.

Incompletely compacted material allows a certain flexibility between the covering layers formed by sheet elements, while fully compacted material leads to a solid bond with high component rigidity. Sandwich elements of this type can be produced endlessly or continuously from roll stock, or they can be produced component-specifically from corresponding cut-to-size pieces. In this case, the cut-to-size pieces may be configured by punched clearances in such a way that a bond with one or the other covering layer takes place only in partial regions and consequently further functions are made possible.

In a refinement of the invention, one or more fully pressed layers may also be provided with one or more intermediate layers of less highly compacted natural fiber mats or sheets, as is advantageous in particular in the case of floor tiles for footfall sound insulation. To improve the acoustic or damping properties, a layer of, for example, foam, rubber or thermoplastic elastomer may be inserted as a middle layer between the natural fiber mats or sheets.

Furthermore, it is possible for a prepreg (semi-manufacture) comprising an initially still loose composite to be heated once again later by supplying energy and, in a following operation, shaped into a component of any desired two-dimensional or three-dimensional contour and, by prescribing different pressing forces, compacted locally to varying degrees. This is also possible in the case of components which are provided with a metal plate on one or both sides and, after supplying energy, can be reshaped for example into cladding or decorative panels. In this case, little compaction of the intermediate layer comprising a natural fiber mat or sheet leads to a good electrical insulating effect and to good heat insulation, while in the case of more highly pressed panels a high component rigidity is achieved.

In a further refinement of the invention, inner or outer regions of the intermediate layer may be strengthened by additional reinforcing linings with, for example, glass, carbon, aramid or natural fibers or some other reinforcing woven fabrics.

One or both covering layers 1, 1' may be additionally provided with a decorative material 3 of, for example, textile material, (polymer) film, leather etc., which is expedient in particular whenever the covering layer concerned consists of compacted natural fibers.

I claim:

1. A composite material having a three-dimensional contour, comprising:
   a first outer covering layer;
   a second outer covering layer disposed at a spacing distance from said first outer covering layer;

an intermediate layer arranged between said first and second outer covering layers and formed by at least one natural fiber mat of renewable raw materials and interspersed with bonding material components selected from the group consisting of fusible particles, foamable particles, and curable substances, said bonding material components bonding fibers of said at least one natural fiber mat to one another and adhesively bonding materials of said first and second outer covering layers; and said spacing distance between said first and second outer covering layers being approximately inversely proportional to a degree of compaction of said intermediate layer.

2. The composite material according to claim 1, wherein said at least one natural fiber mat is formed of a material selected from the group consisting of flax, hemp, jute, kenaf, sisal, and a combination of the materials.

3. The composite material according to claim 1, wherein the natural fibers of said natural fiber mat have a defined critical temperature, and said fusible particles have a melting point below the critical temperature.

4. The composite material according to claim 1, wherein said natural fiber mat has natural fibers with a melting point below 240° C.

5. The composite material according to claim 1, wherein said fusible particles are selected from the group consisting of polypropylene, LD or HD polyethylene, EVA, nylon 11, and nylon 12.

6. The composite material according to claim 1, wherein said natural fiber mat has a natural fiber content of between 30% and 95% and a particle content between 5% and 20%.

7. The composite material according to claim 1, wherein at least some of said fusible particles are fibrous particles.

8. The composite material according to claim 1, wherein said at least one natural fiber mat is one of a plurality of natural fiber mats.

9. The composite material according to claim 8, wherein said plurality of natural fiber mats have a substantially identical material composition and a substantially identical degree of compaction.

10. The composite material according to claim 8, wherein said plurality of natural fiber mats have mutually different material compositions.

11. The composite material according to claim 8, wherein said plurality of natural fiber mats have mutually different degrees of compaction.

12. The composite material according to claim 1, wherein said intermediate layer has a predefined degree of compaction.

13. The composite material according to claim 1, wherein said intermediate layer comprises at least one relatively highly compacted natural fiber mat and at least one less highly compacted natural fiber mats.

14. The composite material according to claim 1, wherein said first and second covering layers are formed of a material selected from the group consisting of metal, thermosetting material, thermoplastic material, wood, laminate, compacted natural fiber layers, and combinations thereof.

15. The composite material according to claim 1, wherein said first and second covering layers are formed of a metal selected from the group consisting of aluminum, copper, and nickel.

16. The composite material according to claim 1, wherein said composite material is produced endlessly.

17. The composite material according to claim 1, wherein said first and second covering layers and said intermediate layer are cut-to-size pieces.

18. The composite material according to claim 1, wherein one of said intermediate layer and said first and second covering layers have punched clearances formed therein.

19. The composite material according to claim 1, wherein said intermediate layer is provided with reinforcing linings.

20. The composite material according to claim 19, wherein said reinforcing linings are formed of a material selected from the group consisting of glass fibers, carbon fibers, aramid fibers, natural fibers, and reinforcing woven fabric.

21. The composite material according to claim 1, wherein at least one of said first and second covering layers is provided with a decorative material.

22. The composite material according to claim 21, wherein said decorative material is a material selected from the group consisting of polymer film, textile material, and leather.

23. The composite material according to claim 1, wherein said intermediate layer is formed of a material selected from the group consisting of foam, rubber, and thermoplastic elastomer.

24. The composite material according to claim 1, wherein said first and second covering layers are formed of a material selected from the group consisting of metal, plastic, and wood veneer.

* * * * *